(12) United States Patent
Maronati et al.

(10) Patent No.: US 9,464,680 B2
(45) Date of Patent: Oct. 11, 2016

(54) BRAKE DISCS WITH BELL

(75) Inventors: Gianluigi Maronati, Bergamo (IT); Leone Oberti, Bergamo (IT); Nino Ronchi, Milan (IT)

(73) Assignee: FRENI BREMBO S.p.A., Curno, Bergamo (IT)

( * ) Notice: Subject to any disclaimer, the term of this patent is extended or adjusted under 35 U.S.C. 154(b) by 159 days.

(21) Appl. No.: 13/701,517

(22) PCT Filed: Jun. 4, 2010

(86) PCT No.: PCT/IB2010/052499
§ 371 (c)(1),
(2), (4) Date: Feb. 15, 2013

(87) PCT Pub. No.: WO2011/151676
PCT Pub. Date: Dec. 8, 2011

(65) Prior Publication Data
US 2013/0133998 A1    May 30, 2013

(30) Foreign Application Priority Data

Jun. 4, 2010  (IT) .............................. MI2010A1005

(51) Int. Cl.
*F16D 65/12* (2006.01)
*F16D 65/847* (2006.01)

(52) U.S. Cl.
CPC ........... *F16D 65/123* (2013.01); *F16D 65/128* (2013.01); *F16D 65/847* (2013.01)

(58) Field of Classification Search
CPC .... F16D 65/123; F16D 65/12; F16D 65/128; F16D 2065/1392; B60G 27/02
USPC ........... 188/218 XL, 18 A; 301/6.1, 6.3, 6.8
See application file for complete search history.

(56) References Cited

U.S. PATENT DOCUMENTS

| | | | |
|---|---|---|---|
| 2,558,296 A * | 6/1951 | Horn ........................ | 188/218 R |
| 4,564,242 A * | 1/1986 | Krude et al. ................... | 301/6.4 |
| 6,224,266 B1* | 5/2001 | Ohtsuki et al. ............... | 384/571 |
| 6,612,656 B2* | 9/2003 | Koschinat ...................... | 301/6.3 |
| 7,111,911 B2* | 9/2006 | Baumgartner et al. .... | 301/105.1 |
| 2005/0018939 A1* | 1/2005 | Niwa et al. ................... | 384/544 |
| 2006/0091719 A1* | 5/2006 | Cowling et al. .............. | 301/6.1 |

FOREIGN PATENT DOCUMENTS

| | | | |
|---|---|---|---|
| DE | 2110482 A1 | 9/1972 | |
| DE | 3152498 A1 | 6/1983 | |
| DE | 3835637 A1 * | 4/1990 | ............. F16D 65/12 |

(Continued)

*Primary Examiner* — Bradley King
*Assistant Examiner* — Stephen Bowes
(74) *Attorney, Agent, or Firm* — Robert E. Alderson, Jr.

(57) ABSTRACT

Discs for disc brakes arranged around a rotational axis, comprising: a braking band and a drum, said drum comprising an edge arranged radially outside a portion for connecting the drum to a hub, said drum further comprising a drum body connecting said edge to the braking band and being suitable to create an interspace between the drum and the hub accommodated therein, said edge delimiting at least one opening with communicates the interspace present between the drum body and the hub with the external of the drum, said opening being arranged radially outside said housing for the hub, and said openings delimited by walls having at least one section inclined with respect to the axial direction are provided.

18 Claims, 6 Drawing Sheets

(56) References Cited

FOREIGN PATENT DOCUMENTS

| DE | 3924849 | A1 | * | 2/1991 | ............ | F16D 65/12 |
| DE | 4233424 | A1 | * | 4/1994 | ............ | F16D 65/12 |
| DE | 10241867 | A1 | | 3/2004 | | |
| DE | 10260467 | A1 | | 7/2004 | | |
| EP | 143264 | A1 | * | 6/1985 | ............ | F16D 65/12 |
| JP | 58085701 | A | * | 5/1983 | ............ | B60B 27/00 |
| JP | 06058351 | A | * | 3/1994 | ............ | F16D 65/12 |

* cited by examiner

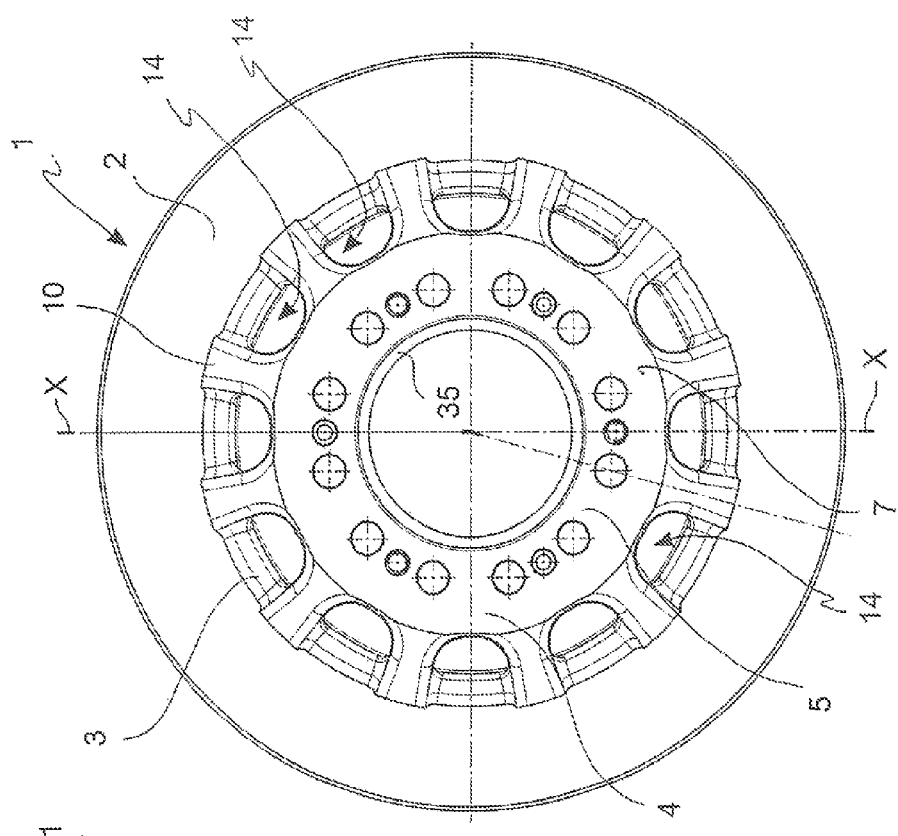
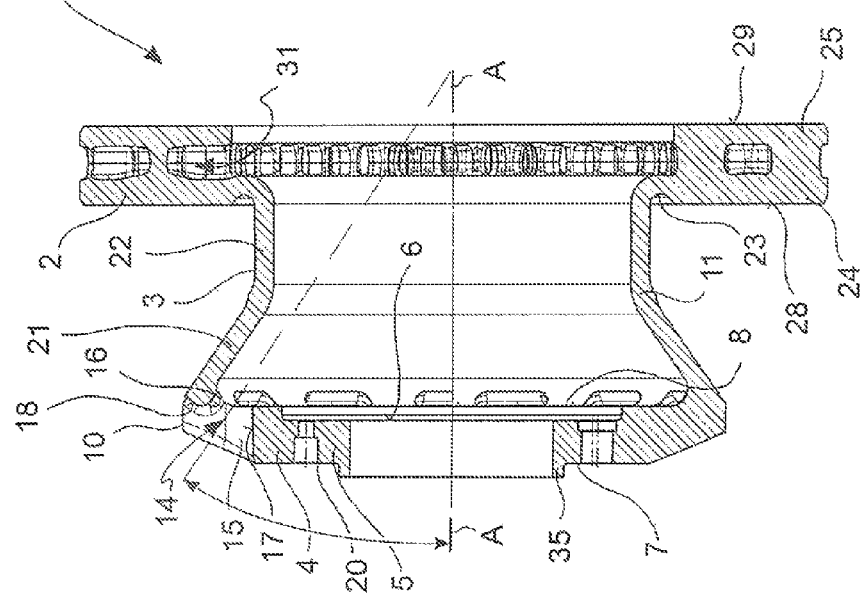

BRAKE DISCS WITH BELL

CROSS-REFERENCE TO RELATED APPLICATIONS

This application is a National Phase Application of PCT International Application No. PCT/IB2010/052499, International Filing Date, Jun. 4, 2010, claiming priority to Italian Patent Application No. MI2010A001005, filed Jun. 4, 2010, both of which are hereby incorporated by reference in their entirety.

FIELD OF THE INVENTION

The present invention refers to a disc brake disc comprising a braking band and a drum for coupling the disc to a support hub of a vehicle wheel.

In particular, the present invention refers to a disc brake disc, for example for commercial vehicles.

BACKGROUND OF THE INVENTION

As known, commercial vehicles have elements for supporting the wheel-rims or hubs, robust enough to bear heavy transport loads.

Typically, these hubs are connected to axles by means of bearings, which allow free rotation of the hub and thus of the wheel-rim connected thereto. In cases where these hubs are used for commercial vehicles, the bearings, accommodated in the hub, are required to bear even extremely heavy loads. Though the friction between the axle and the hub is particularly low, due for example to the use of roller bearings, should the action to be transmitted through the bearing be particularly high there occurs a considerable heating of the bearing and of all components adjacent thereto. This heating should be suitably discharged so as not to jeopardise the correct operation of the bearings accommodated in the hub and thus possibly of the disc brake disc connected thereto.

Upon actuation, also the braking system causes a specific production of heat. The braking action of the vehicle transforms, due to the friction between the components thereof, kinetic energy into thermal energy. The fact that the disc brake disc is connected to the support hub of the wheel-rim, causes, in case of frequent and intense braking actions, for example in cases in which the vehicle is travelling descending an alpine pass, a high raising of the temperature of the disc brake disc and also of the portions thereof connected to the hub also causing a considerable heating of the hub and of the bearing accommodated therein. At times, failure to suitably cool the brake may jeopardize not only the correct operation of the disc but also of the bearing.

Therefore, there arises a particular need of finding and providing a solution capable of allowing suitably cooling not only the disc brake disc, but particularly the interface between the disc brake disc and the hub which accommodates the bearing.

Solutions having means for the passage of cooling air to the base of the disc brake disc, particularly to the base of the braking band thereof, are known.

For example, document IT 1 147 976 has a disc brake disc connected to a hub provided with a flange which moves the disc away from the cylindrical portion of the hub suitable to accommodate the bearing. In addition, this known solution has, in the cylindrical drum-shaped portion for connecting to the hub, openings arranged slightly after the braking band, suitable to circulate cooling air around the braking band, the air then being conveyed to specific sheets fixed onto the rim outside the wheel.

Though satisfactory from various points of view, this prior art embodiment requires a considerable radial overall dimension to move the disc brake disc away from the portion of the hub suitable to accommodate the bearing. Furthermore, this prior art solution allows the circulation of cooling air solely in proximity to the portion of the hub facing the vehicle, leading to non-uniform cooling of the hub and of the bearing contained therein.

Also document DE 39 42 651 shows a solution similar to the aforedescribed one for use in a vehicle, wherein the disc brake disc is of the ventilated type.

Though satisfactory from various points of view, this solution is particularly more indicated for cooling the braking band than the hub and the bearing contained therein. As a matter of fact, in order to convey the air around the braking band better, provided for is a sheet arranged inside the disc brake disc which separates the braking band from the hub, pushing the air towards the openings provided for in the connection portion between the braking band and the drum so as to obtain maximum cooling possible in proximity to the braking band. Should the heat generated by the braking action not be suitably released and thus traverse the drum reaching the hub, for example due to the low speeds of the vehicle, this prior art solution would not allow further and separate cooling aimed at avoiding malfunctioning of the bearing.

Document FR 1 491 828 shows a braking system solution also in which a disc brake provided with a drum having openings not specifically developed for the aeration of the hub is shown.

SUMMARY OF THE INVENTION

An object of the present invention is that of overcoming the aforedescribed prior art drawbacks and simultaneously develop and provide a disc brake disc and a disc brake disc and support hub assembly that is capable of cooling the bearing accommodated in the hub.

Further object of the present invention is that of finding and providing a solution capable of providing maximum uniform cooling of the entire hub and the bearing contained therein, particularly in the portion thereof nearest to the wheel-rim fixing elements.

These and other objects are attained by means of a disc brake disc as described in claim 1 attached herein, as well as by means of an assembly as described in claim 16.

According to a general embodiment, a disc brake disc comprises a braking band and a drum. Said drum comprises a connection flange, provided with a portion for connecting to a hub. Said connection portion comprises a surface facing the hub and an opposite surface facing a wheel rim. The surface facing the hub comprises a housing suitable to accommodate an end portion of the hub.

Preferably, according to an embodiment, provided for radially external with respect to the portion for connecting to the hub of the flange for connecting the drum is an edge, in which—advantageously—said edge is radially external with respect to said housing suitable to accommodate the hub.

According to an embodiment, said drum also comprises a drum body connecting said edge to the braking band.

Said drum body delimits, alongside the wheel-rim, an outer space and an interspace—internally—between the drum and the hub accommodated therein. According to an embodiment, said interspace axially traverses the internal extension of the drum up to reaching the edge of the flange.

According to an embodiment, said edge delimits at least one opening which communicates said interspace provided between the drum body and the hub with the space outside the drum.

According to an embodiment, said at least one opening is radially external with respect to the hub housing.

According to an embodiment, said at least one opening is radially external with respect to the drum body.

Said at least one opening is, according to an embodiment, delimited by walls which provide for at least one inclined section with respect to the axial direction.

Due to the provision of an edge which is radially external with respect to the flange for connecting the drum to the hub it is possible to provide an interspace capable of allowing free circulation of the cooling fluid, for example air, between the drum body and the hub circulating over the entire axial extension thereof, not only allowing suitable cooling of the braking band, particularly to the base thereof, but also a suitable cooling of the hub and bearing accommodated therein.

Due to the provision of at least one opening in the radially external edge, the cooling air may reach the space comprised between the braking band and the rim also suitably cooling the braking band in the braking surface thereof facing the rim before flowing outwards through specific openings provided in the wheel-rim, for example the openings provided for between the connection spokes between the channel for accommodating the tyre and the flange for connecting the wheel rim to the hub.

Further embodiments and advantages shall be apparent from the description of some embodiments of the invention outlined hereinafter, solely provided by way of non-limiting example in the description that follows.

The constructional and functional characteristics of the disc brake disc and of the assembly according to the present invention shall be understood in-depth from the description outlined hereinafter in which reference is made to the attached drawings which represent some preferred but non-limiting embodiments thereof.

BRIEF DESCRIPTION OF THE FIGURES

FIG. 9 represents an axial view—from the wheel side—of the disc brake disc of FIG. 7; and FIG. 10 represents a section according to line X-X of FIG. 9 of the disc brake disc of FIG. 7.

DETAILED DESCRIPTION

Figure 2:
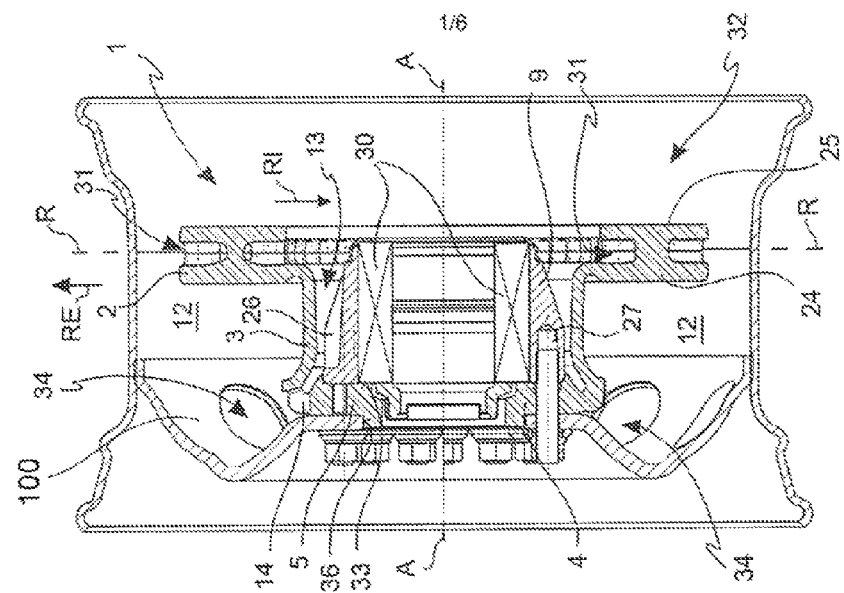
FIG. 2 represents a section according to line II-II of FIG. 1 of the assembly of this FIG. 1.

According to a general embodiment and as observable from the figures, a disc brake disc 1 is arranged around a rotational axis A-A. Said disc 1 comprises a braking band 2 extended around said rotational axis A-A and forms two opposite braking surfaces 28, 29 suitable to cooperate with brake caliper pads arranged astride said braking band.

Said disc 1 defines an axial direction A-A coincident or parallel to said rotational axis A-A, a radial direction R-R which in turn defines a radially external direction RE when moving away from said axial direction A-A, as well as a radially internal direction RI when approaching said axial direction A-A, as well as a circumferential direction T-T orthogonal to said axial direction A-A and to said radial direction R-R.

Said disc further comprises a drum 3. Said drum comprises a connection flange 4, having a connection portion 5 suitable to connect the drum 3 to a support hub 9 onto which a rim 100 of a vehicle wheel is connected.

According to an embodiment, said connection portion 5 of said connection flange 4 comprises a surface facing the hub 6 and an opposite surface 7 facing the wheel rim.

According to an embodiment, said surface facing the hub 6 comprises a housing 8 suitable to accommodate a portion of the hub 9.

According to an embodiment, said drum 3 further comprises an edge 10 arranged radially outside said connection portion 5 of the drum to the hub.

According to an embodiment, said edge 10 is arranged radially outside said housing 8 suitable to accommodate the hub 9.

According to an embodiment, said drum 3 further comprises a drum body 11 connecting said edge 10 to the braking band 2. Said drum body 11 delimits an outer space 12 comprised between the drum 3 and the wheel rim 100.

According to an embodiment, said drum body 11 is suitable to create an interspace 13 between the drum 3 and the hub 9 accommodated therein. Said interspace axially traverses, according to the axial direction A-A, substantially the entire drum 3 until it reaches said edge 10.

According to an embodiment, said edge 10 delimits at least one opening 14 which communicates the interspace 13 present between the drum body 11 and the hub 9 with the external of the drum 12.

According to an embodiment, said at least one opening 14 is arranged radially outside said housing 8 for the hub 9.

According to an embodiment, said at least one opening 14 is delimited by walls 15 having at least one section 16 inclined in the axial direction A-A.

According to an embodiment, a plurality of openings 14 are present in said edge 10 of the drum 3 and are arranged along a circumferential direction T-T at regular intervals.

According to an embodiment, the walls 15 delimiting said opening 14 have at least one second wall section 17 having direction parallel to the axial direction A-A.

According to an embodiment, said at least one inclined section 16 has an inclination with respect to the axial direction A-A comprised between 1 sexagesimal degree and 89 sexagesimal degrees, preferably an inclination comprised between 20 sexagesimal degrees and 50 sexagesimal degrees.

According to an embodiment, said walls 15 delimiting said opening 14 have an end portion 18 facing the outer space 12 folded backwards towards the braking band 2.

According to an embodiment, said drum body 11 connecting the edge 10 to the braking band 2 delimits with a portion thereof at least one opening 14 with a section thereof inclined with respect to the axial direction A-A comprised between 1 sexagesimal degree and 89 sexagesimal degrees, preferably an inclination comprised between 20 sexagesimal degrees and 50 sexagesimal degrees and even more preferably with an inclination comprised between 30 sexagesimal degrees and 35 sexagesimal degrees.

According to an embodiment, said drum body 11 connecting the edge 10 to the braking band 2 comprises a conical body portion 21 which widens towards said edge 10 and which is connected to said edge 10.

According to an embodiment, said drum body 11 continues from said conical section 21 towards the braking band 2 with a substantially cylindrical body portion 22.

According to an embodiment, said at least one opening 14 is connected to the interspace 13 by means of an annular groove 19 having at least two walls parallel and opposite to each other oriented according to a direction substantially inclined with respect to the axis A-A.

According to an embodiment, said at least one opening 14 is connected to the interspace 13 by means of an annular groove 19 having at least two walls parallel and opposite to each other oriented according to a direction inclined with respect to the axis A-A, a direction having an inclination comprised between 20 sexagesimal degrees and 50 sexagesimal degrees, preferably comprised between 30 sexagesimal degrees and 35 sexagesimal degrees.

According to an embodiment, said opposite surface 7 of the connection portion 5 of the flange 4 for connecting the drum 3 facing the rim 100 has a housing 20 for the wheel-rim 100 arranged radially internally with respect to said edge 10 and with respect to said at least one opening 14.

According to an embodiment, said drum 3 is provided in a single piece with said braking band 2.

According to an embodiment, said drum body 11 is connected to the braking band 2 forming a release channel 23 arranged undercut with respect to the braking surface, preferably the braking surface 7 facing the wheel.

According to an embodiment, said braking band 2 is a ventilated braking band comprising opposite plates 24, 25 spaced from each other to form an internal ventilation channel 31 and wherein said drum body 11 is connected to the plate 24 facing the wheel-rim 100.

According to an embodiment, said edge 10 is radially outside said drum body 11.

According to an embodiment, said hub 9 comprises a body having an external surface facing the drum body 11 from which ribs 26 extend radially and in axial direction.

According to an embodiment, said ribs 26 simultaneously constitute elements for lightening the hub, reinforcement elements, and radiator elements for cooling the hub, as well as elements for conveying air into the interspace 13 between drum and hub.

According to an embodiment, said ribs 26 are circumferentially distributed on the hub 9 and accommodate housings 27 to receive screws for connecting the drum 3 and the wheel-rim 100.

According to an embodiment, said ribs 26 are tapered moving away from the flange 4 for connecting the drum 3.

As possibly further observable from the figures, according to an embodiment, an assembly 32 comprises a disc brake disc 1, a support hub 9, keyed on which is one or more roller bearings 30, and a wheel rim 100.

The assembly 32 has a symmetry axis or rotational axis A-A. A radial axis R-R is provided transverse to said rotational axis A-A. With respect to this radial axis R-R the direction moving away from the rotational axis A-A is indicated as the external radial direction indicated in the figures with RE. The motion direction of the radial direction R-R approaching the rotational axis A-A is indicated as the internal radial direction, indicated in the figure with reference RI.

Figure 1:
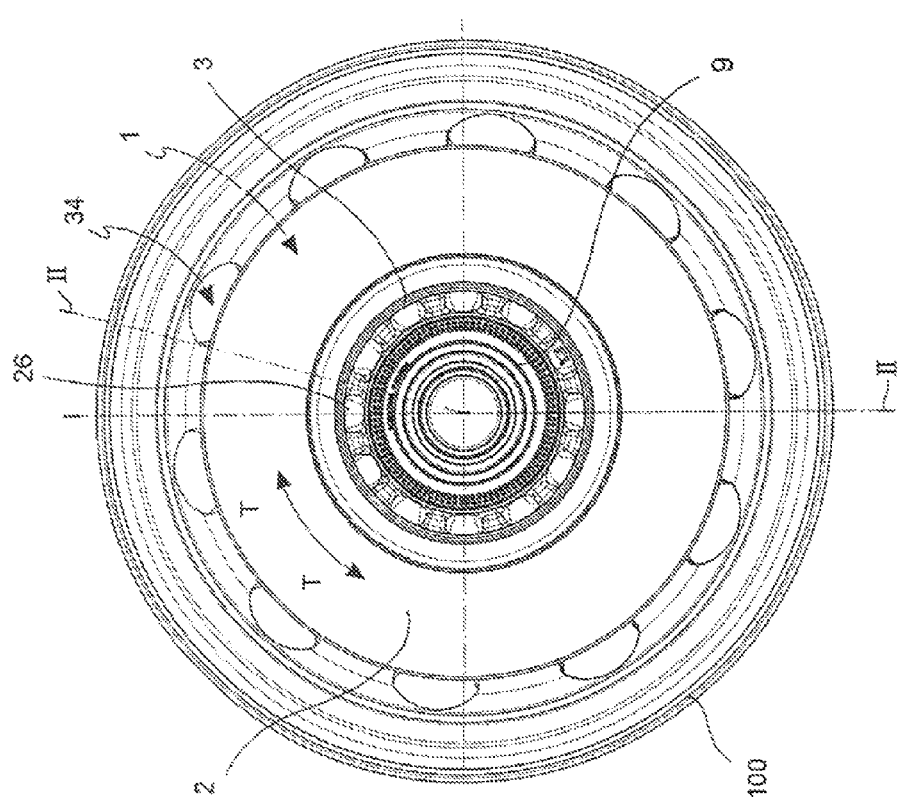
FIG. 1 represents an axial view—from the vehicle side towards the wheel-rim—of a disc brake disc assembly fitted on a hub onto which a wheel rim is fixed.
Figure 3:
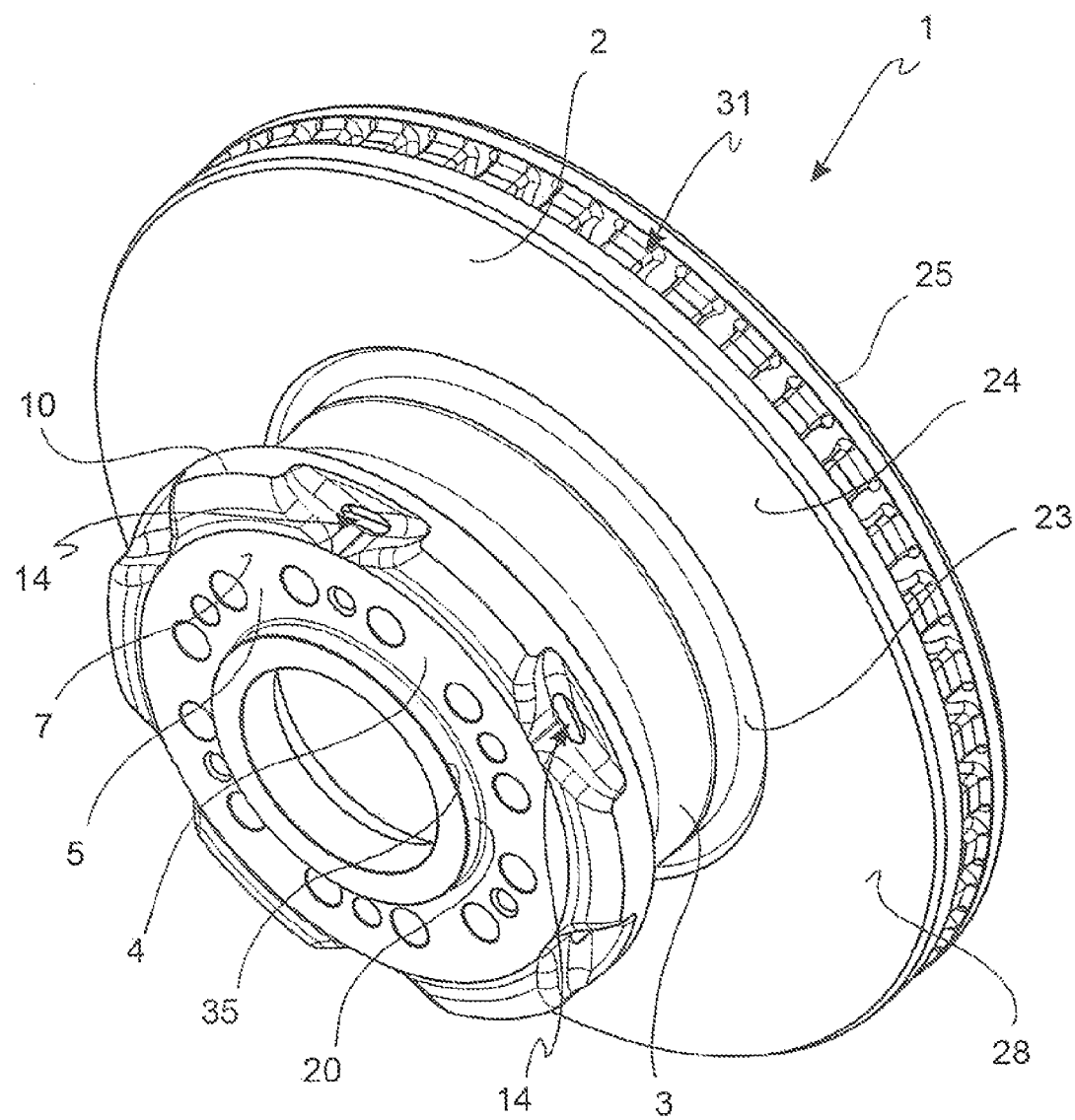
FIG. 3 illustrates an axonometric view—from the wheel side—of a disc brake disc according to a first embodiment.
Figure 4:
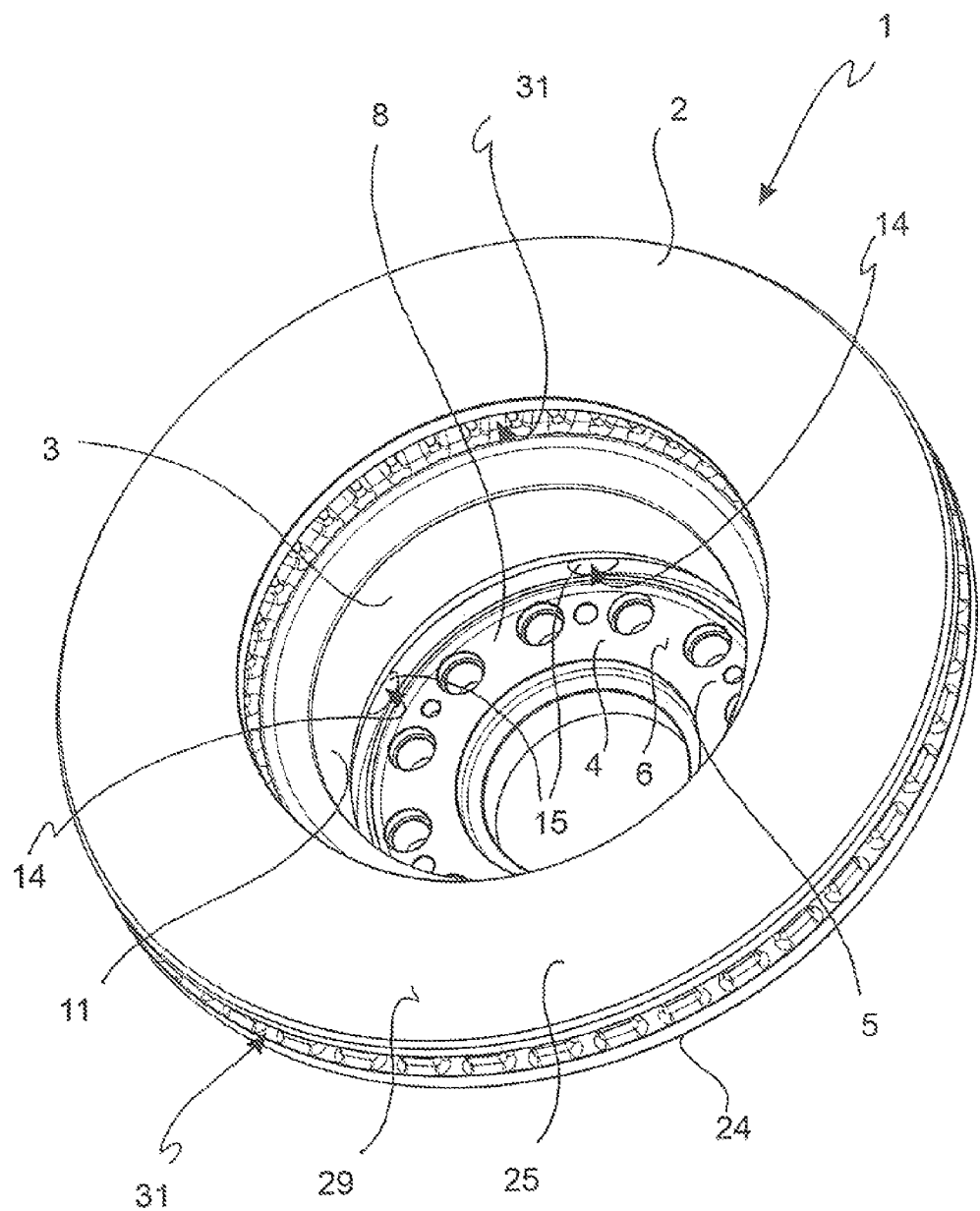
FIG. 4 illustrates an axonometric view—from the hub side—of the disc brake disc of FIG. 3.
Figure 6:
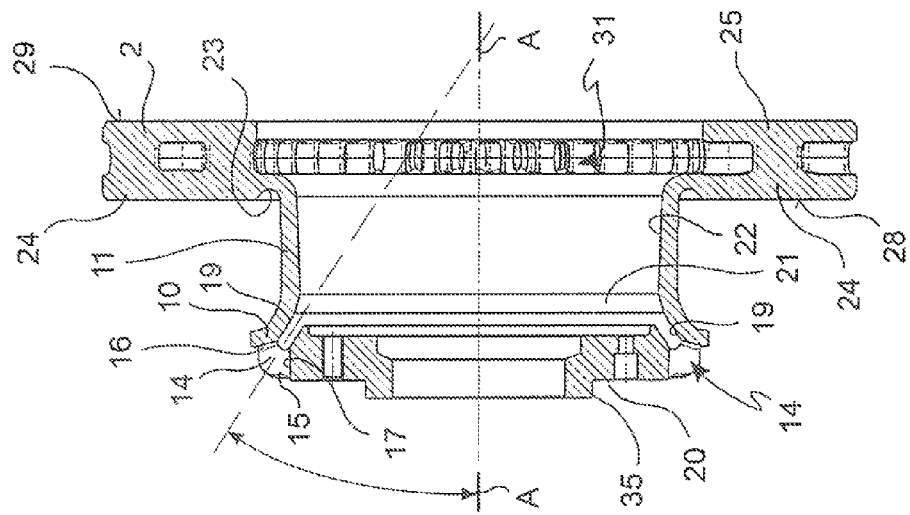
FIG. 6 represents section VI-VI of FIG. 5 of the disc brake disc of FIG. 3.
Figure 5:
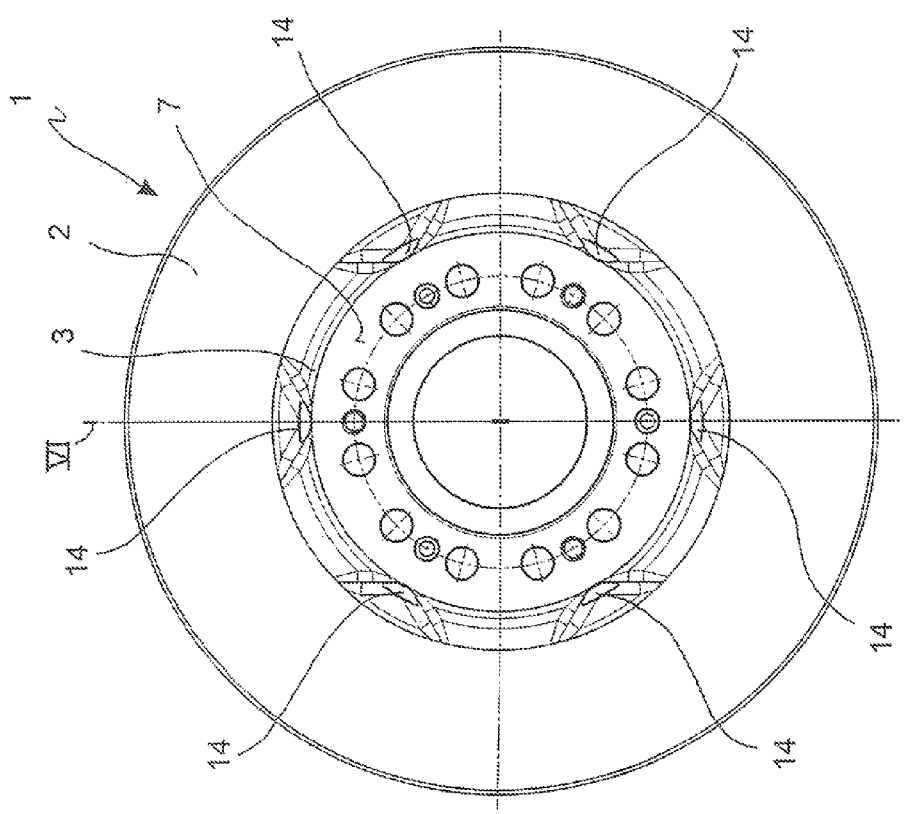
FIG. 5 represents a view—according to the axis from the wheel rim to the vehicle—of the disc brake disc according to the FIG. 3.
Figure 7:
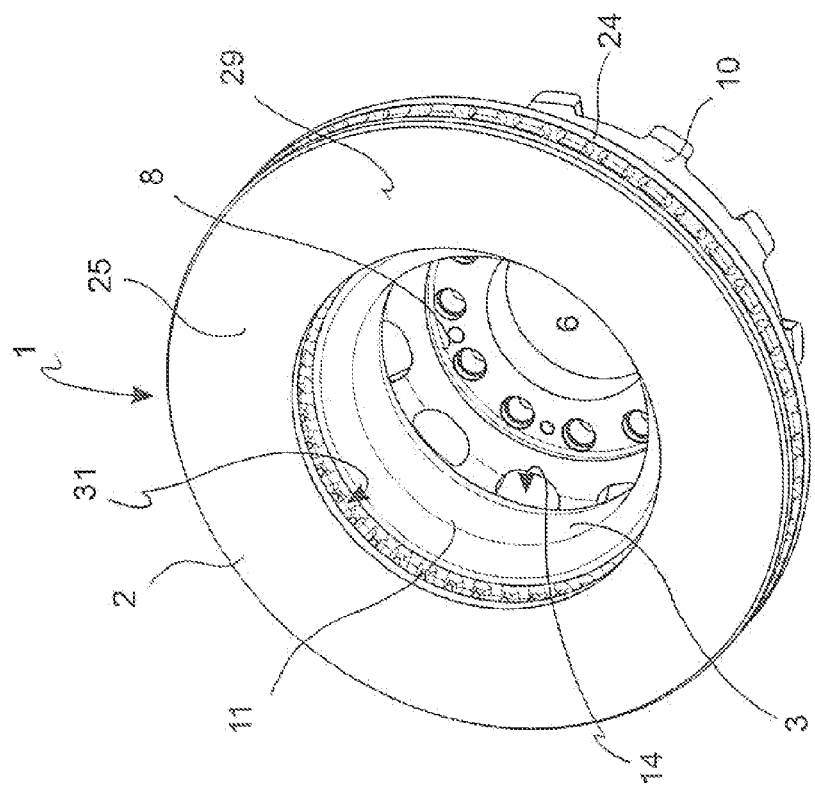
FIG. 7 represents an axonometric view—from the wheel side—of a disc brake disc according to a second embodiment.
Figure 8:
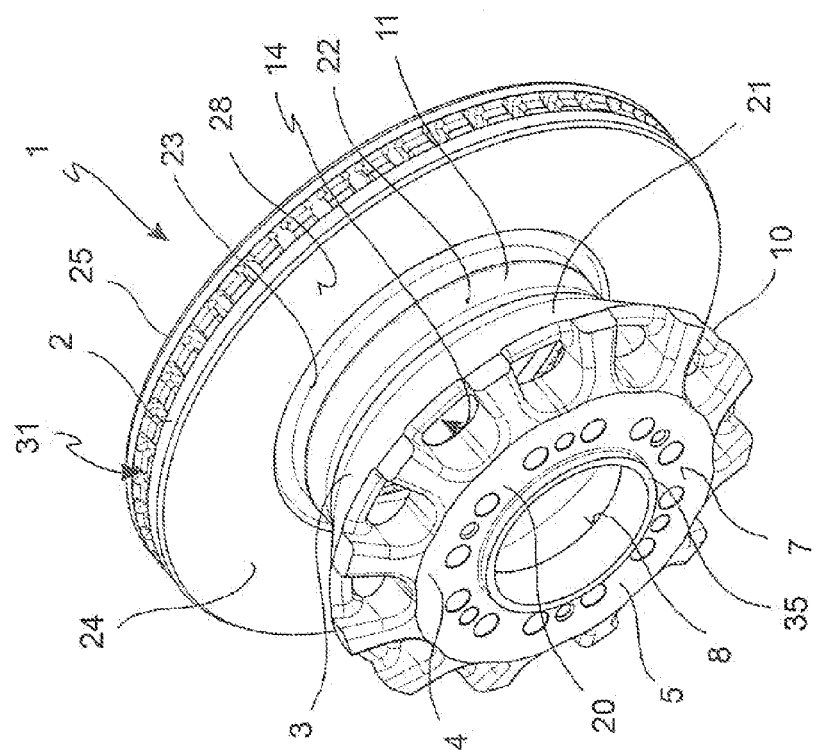
FIG. 8 represents an axonometric view according to the hub side of the disc brake disc of FIG. 7.

The circumferential or tangential direction T-T, as indicated in FIG. 1 is provided transverse to the axial direction A-A and to the radial direction R-R.

According to an embodiment, a hub 9 has, keyed therein, bearings 30 which allow coupling said hub 9 to an axle of a vehicle in such a manner that the hub 9 is free to rotate with respect to the axle.

Said hub 9, has a coupling surface 33 at the end thereof facing the wheel rim 100. According to an embodiment, said hub 9 has a cylindrical body provided with an internal coupling surface with a bearing 30 and an external surface suitable to release the heat generated by the bearing 30 during the operation thereof.

According to an embodiment, said hub 9 externally has ribs 26 suitable to reinforce the hub 9 and simultaneously lighten the structure thereof, also allowing forming—inside said ribs—housings for screws 27 suitable for coupling to the hub of the disc brake disc 1—as well as, externally thereof, the wheel rim 100.

According to an embodiment, said hub 9 has an end thereof for coupling to the disc brake disc 1 suitable for a firm connection of the disc 1 as well as for centering thereof with respect to the rotational axis A-A.

According to an embodiment, the disc brake disc 1 comprises a braking band 2 arranged in a plane transverse to the rotational axis A-A and coplanar to the radial direction R-R.

According to an embodiment said braking band 2 is of the ventilated type, comprising opposite plates 24, 25, in particular a plate 24 arranged towards the wheel rim 100 and an opposite plate 25 arranged towards the vehicle.

According to an embodiment said plates 24 and 25 are spaced from each other by means of connection elements which allow maintaining a ventilation conduit between said plates 24, 25. For example, said elements for connecting the plates 24, 25 are pins suitable for firmly connecting the plates 24, 25 to each other and at the same time for efficient release of the heat generated during the braking action.

According to an embodiment the ventilation channel 31 of the braking band 2 is open in the internal radial edge thereof inwards the rotational axis A-A of the disc 1, allowing easy inflow of the cooling air which traverses the entire ventilation channel 31 until it exits from the external radial periphery of the braking band 2 towards the environment outside the disc.

According to an embodiment, said plates 24, 25 externally have braking surfaces 28, 29, in particular, a first braking surface 28 facing the wheel rim 100 and an opposite braking surface 29 facing the vehicle.

Said braking surfaces 28, 29 are suitable to cooperate with pads accommodated in a caliper body directly supported by a fixed spindle with respect to the braking band 2 which instead rotates around the rotational axis A-A.

According to an embodiment said braking band 2 is supported on the hub so as to be sufficiently far from the wheel rim 100 so as to be coupled with the caliper body on which it is arranged astride.

Particularly, the braking band 2 must be sufficiently wide to allow having wide braking surfaces 28, 29, so as to allow suitable braking action, and at the same time said braking band 2 must be sufficiently small in size to allow easy accommodation thereof inside the wheel rim 100 also considering the overall dimension of the caliper body arranged astride thereon.

Said braking band 2 is supported by a drum 3.

According to an embodiment said drum has a drum body axially extended, at least by a portion thereof, connecting to an edge 10 of the drum and thus to a flange 4 for connecting the drum to the hub 9.

The axial extension of the drum body 11 allows positioning the braking band 2 far from the coupling surface of the hub 33, so as to allow the caliper body to be accommodated inside the wheel rim 100.

According to an embodiment said drum body 11 has a cylindrical section 22.

Said cylindrical section 22 is connected at a first end to the braking band.

According to an embodiment said cylindrical section 22 is connected to the braking band 2 forming a release channel 23, preferably arranged undercut with respect to the braking surface 28 facing the wheel of the braking band 2, facilitating a small dimensional deformation of the disc 1 during the high thermal excursions of the braking band 2 caused by the braking action.

According to an embodiment, said drum body 11 has a conical section 21.

According to an embodiment, said conical section 21 connects the cylindrical section 22 to the edge 10 of the flange connecting the drum body 11 to the flange for connecting the drum to the hub 4.

According to an embodiment said drum 3 has an edge 10 which is radially more external with respect to the drum body 11, so as to allow movement thereof away from the hub, and in particular from the coupling surface of the hub 33 and at the same time have a small overall dimension of the drum.

According to an embodiment, said drum body 11 is connected to the flange 4 for connecting the drum to the hub 9 by means of an annular edge 10.

Said drum body 11 forms—with the side thereof facing the rotational axis A-A—an interspace 13 between the drum 3 and the hub 9.

According to an embodiment said interspace 13 is open in a fluidic manner towards the vehicle so as to allow free circulation of a cooling fluid
- towards the braking surface of the braking band facing the vehicle,
- towards the ventilation conduit 31 of the ventilated braking band,
- towards the interspace, so as to allow the cooling fluid to touch the external surface of the hub 9 and substantially over the entire axial extension thereof up to reaching the edge 10 of the drum 3.

According to an embodiment said edge 10 has at least one edge opening 14 which provides fluid communication between said interspace 13 and the space outside the drum arranged between the wheel rim 100 and the disc 1, indicated in the figures with reference 12.

Thus, the cooling fluid which traverses the interspace 13 touches and cools the external surface of the hub, for example facilitating heat exchange with the ribs of the hub 26, and then reaches the edge 10 of the drum and exits through at least one opening 14 from the edge 10 of the drum 3 reaching the space outside the drum 12 in which it may cool the braking surface facing the wheel 28 of the braking band 2 and then exiting from the openings 34 provided for in the wheel rim 100.

According to an embodiment, said at least one opening 14 are a plurality of openings 14 arranged, for example, equally spaced along the circumferential direction T-T of development of the edge 10.

According to an embodiment said openings are delimited by walls 15 having at least one wall section 16 inclined with respect to the rotational axis A-A. According to an embodiment, said inclined wall section 16 forms an acute angle with respect to the rotational axis A-A, angle facing the wheel rim 100.

According to an embodiment said walls 15 delimiting the opening 14 have a second wall section 17 arranged parallel to the rotational axis A-A.

Advantageously said opening has walls having a section diverging from each other at the free end thereof.

According to an embodiment said walls 15 delimiting the opening 14 have a wall portion 18 facing the space outside the drum 12 which is folded facing the braking band 2.

According to an embodiment said edge 10 is connected to a flange for connecting the drum to the hub 4 substantially arranged transverse to the rotational axis A-A and suitable to be coupled to the coupling surface of the hub 33.

According to an embodiment said drum body 11 and said flange 4 for connecting the drum to the hub delimit—therebetween—a section for conveying the cooling fluid towards the opening 14.

According to an embodiment an annular groove 19 is provided in said edge 10.

According to an embodiment said annular groove 19 has wall sections opposite and parallel from each other defining an annular conduit inclined with respect to the rotational axis A-A.

Preferably, according to an embodiment, said walls opposite and parallel from each other are inclined forming an acute angle with respect to the rotational axis A-A.

Said flange 4 for connecting the drum 3 to the hub 9 has a flange connection portion 5. Said connection portion 5 has a first surface facing the hub 6 and an opposite surface facing the wheel 7.

According to an embodiment, provided in said surface 6 facing the hub of the connection portion 5 of the flange 4 is a hub housing 8 recessed in the connection flange 4 so as to form an abutment surface for the firm connection of the drum to the hub and a centring edge, suitable to cooperate with the centring surface provided for at the free end of the hub 9.

According to an embodiment, said edge 10 of the flange is radially outside said hub housing 8.

Said connection portion 5 of the flange 4 of the drum 3 has—on the opposite surface 7 thereof facing the wheel—an annular relief suitable for centring-coupling the wheel rim 100, being inserted into a specific opening 36 provided for in the wheel rim 100.

Due to the provision of an edge 10 of the flange 4 of the drum 3 which is radially external with respect to the housing for coupling the drum to the hub 8, it is possible to provide for at least one vent opening capable of communicating an interspace provided for between the hub 9 and the drum 3 with the outer space 12 surrounding the drum radially external with respect to the rotational axis A-A.

This solution allows maintaining the body 11 of the drum 3 arranged closer to the hub so as to reduce the overall dimension of the disc brake disc to the maximum, simultaneously maintaining wide braking surfaces 28, 29 of the braking band 2, and simultaneously preserving an interspace 5 capable of allowing the flow of the cooling fluid to touch the external surface of the hub.

Having provided for at least one opening 14 at the edge 10 of the connection flange 4 capable of communicating the interspace 13 with the space outside the drum 12, allows the cooling fluid to flow over the entire axial extension of the hub 9 until it touches the end coupling zone between the hub and the drum, guaranteeing a uniform and complete cooling of the entire hub and of the bearing keyed therein.

Due to the provision of a drum body 11 provided with a conical section 21 it is possible to provide for an edge 10 of the connection flange 4 particularly radially external with respect to the drum body 11 particularly cylindrical section 22 thereof, thus nearing the braking band 2 to the rotational axis A-A even more so as to reduce the overall dimensions of the disc brake disc 1 and allow the accommodation of a caliper body into the space present between the disc brake disc 1 and the wheel rim 100.

The aforedescribed embodiments may be subjected, by a man skilled in the art to meet contingent needs, to modifications, adaptations and replacement of elements with other functionally equivalent ones, without for this reason departing from the scope of the claims outlined hereinafter.

All the characteristics described as belonging to a possible embodiment, may be provided independently from the other characteristics of the previously described embodiments.

LIST OF REFERENCES

| | |
|---|---|
| 1 | Disc |
| 2 | Braking band |
| 3 | Drum |
| 4 | Flange for connection between the drum and the hub |
| 5 | Flange connection portion |
| 6 | Surface of the connection portion facing the hub |
| 7 | Opposite surface facing the wheel |
| 8 | Hub housing |
| 9 | Hub |
| 10 | Connection flange edge |
| 11 | Drum body |
| 12 | Space outside the drum |
| 13 | Interspace between the drum and the hub |
| 14 | Opening in the edge between the interspace and the outer space |
| 15 | Walls of the opening |
| 16 | Section of the inclined wall |
| 17 | Second section of the wall parallel to axis A-A |
| 18 | Portion of the wall facing the outer space |
| 19 | Annular groove |
| 20 | Wheel rim housing |
| 21 | Conical section of the body |
| 22 | Cylindrical section of the body |
| 23 | Release channel |
| 24 | Braking band plate facing the wheel rim |
| 25 | Braking band plate facing the vehicle |
| 26 | Hub ribs |
| 27 | Housing for screws |
| 28 | Braking surface facing the wheel |
| 29 | Braking surface facing the vehicle |
| 30 | Bearing |
| 31 | Channel for ventilating the ventilated band |
| 32 | Disc-hub-bearing assembly |
| 33 | Surface for coupling to the drum of the hub |
| 34 | Openings of the wheel rim |
| 35 | Annular relief for centring the wheel rim |
| 36 | Axial opening of the wheel rim |
| 100 | Wheel rim |
| A-A | Rotational axis |
| R-R | Radial direction |
| T-T | Circumferential direction |

The invention claimed is:

1. A disc for disc brakes arranged around a rotational axis, comprising:
a braking band extending around said rotational axis and forming two opposite braking surfaces suitable for cooperating with brake caliper pads, arranged astride said braking band;
said disc defining an axial direction coincident or parallel to said rotational axis, a radial direction defining a radially external direction when moving away from said axial direction, as well as a radially internal direction when approaching said axial direction, as well as a circumferential direction orthogonal to said axial direction and said radial direction;
said disc further comprising a drum;
said drum comprising a connection flange, having a connection portion suitable for connecting the drum to a support hub onto which a rim of a vehicle wheel is connected;
said connection portion of said connection flange comprising a surface facing the support hub and an opposite surface facing the wheel rim;
said surface facing the support hub comprising a housing suitable for accommodating a portion of the support hub;
said drum further comprising an edge arranged radially outside said portion for connecting the drum to the support hub;
said edge being arranged radially outside said housing suitable for accommodating the support hub;
said drum further comprising a drum body connecting said edge to the braking band;
said drum body delimiting an outer space between the drum and the wheel rim;
said drum body being suitable for creating an interspace between the drum and the support hub accommodated therein, said interspace axially traversing, according to the axial direction, substantially the entire drum until it reaches said edge;
wherein at least one opening is formed between an edge of the connection flange and the edge of the drum to facilitate movement of air through the interspace and away from the braking band;
wherein said at least one opening is delimited by walls having at least one section inclined with respect to the axial direction and wherein said at least one opening is connected to the interspace by means of an annular groove having at least two walls parallel and opposite to each other oriented according to a direction substantially inclined with respect to the axis.

2. The disc of claim 1, wherein said at least one opening is a plurality of openings, the plurality of openings being arranged along a circumferential direction at regular intervals.

3. The disc of claim 1, wherein said at least one inclined section has an inclination with respect to the axial direction between 1 degree and 89 degrees.

4. The disc of claim 1, wherein said walls delimiting said opening have an end portion facing the outer space and wherein said end portion widens at its opening to the outer space.

5. The disc of claim 1, wherein said drum body delimits with a portion thereof at least one opening with a section thereof inclined with respect to the axial direction between 1 degree and 89 degrees.

6. The disc of claim 1, wherein said drum body connecting the edge to the braking band comprises a conical body portion which widens towards said edge.

7. The disc of claim 6, wherein said drum body continues from said conical body portion towards the braking band with a cylindrical body portion.

8. The disc of claim 1, wherein the annular groove having at least two walls parallel and opposite to each other are inclined between 20 degrees and 50 degrees with respect to the axis.

9. The disc of claim 1, wherein said opposite surface facing the rim of the connection portion of the connection flange of the drum has a housing for the wheel-rim arranged radially internally with respect to said edge and with respect to said at least one opening.

10. The disc of claim 1, wherein said drum is provided in a single piece with said braking band.

11. The disc of claim 1, wherein said drum body is connected to the braking band forming a release channel in an undercut arrangement with respect to the braking surface.

12. The disc of claim 1, wherein said braking band is a ventilated braking band comprising opposite plates spaced from each other to form an internal ventilation channel and wherein said drum body is connected to the plate facing the wheel-rim.

13. The disc of claim 1, wherein said edge is radially outside said drum body.

14. An assembly comprising a disc brake disc arranged around a rotational axis, comprising:
- a braking band extending around said rotational axis and forming two opposite braking surfaces suitable for cooperating with brake caliper pads, arranged astride said braking band;
- said disc defining an axial direction coincident or parallel to said rotational axis, a radial direction defining a radially external direction when moving away from said axial direction, as well as a radially internal direction when approaching said axial direction, as well as a circumferential direction orthogonal to said axial direction and said radial direction;
- said disc further comprising a drum;
- said drum comprising a connection flange, having a connection portion suitable for connecting the drum to a support hub onto which a rim of a vehicle wheel is connected;
- said connection portion of said connection flange comprising a surface facing the support hub and an opposite surface facing the wheel rim;
- said surface facing the support hub comprising a housing suitable for accommodating a portion of the support hub;
- said drum further comprising an edge arranged radially outside said portion for connecting the drum to the support hub;
- said edge being arranged radially outside said housing suitable for accommodating the support hub;
- said drum further comprising a drum body connecting said edge to the braking band;
- said drum body delimiting an outer space between the drum and the wheel rim;
- said drum body being suitable for creating an interspace between the drum and the support hub accommodated therein, said interspace axially traversing, according to the axial direction, substantially the entire drum until it reaches said edge;
- wherein at least one opening is formed between an edge of the connection flange and the edge of the drum to facilitate movement of air through the interspace and away from the braking band;
- wherein said at least one opening is delimited by walls having at least one section inclined with respect to the axial direction, and wherein said at least one opening is connected to the interspace by means of an annular groove having at least two walls parallel and opposite to each other oriented according to a direction substantially inclined with respect to the axis; and
- wherein the support hub further accommodates a bearing.

15. The assembly of claim 14, wherein the support hub comprises a body having an external surface facing the drum body from which ribs extend radially and in an axial direction.

16. The assembly of claim 15, wherein said ribs allow cooling and conveying of air into the interspace between the drum and the support hub.

17. The assembly of claim 15, wherein said ribs are circumferentially distributed on the support hub and accommodate housings to receive screws for connecting the drum and the wheel-rim.

18. The assembly of claim 15, wherein said ribs are tapered moving away from the connection flange of the drum.

* * * * *